(12) United States Patent
Ohara

(10) Patent No.: US 7,372,421 B2
(45) Date of Patent: May 13, 2008

(54) ANTENNA DEVICE AND COMMUNICATION SYSTEM USING IT

(75) Inventor: Masahiro Ohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/555,136

(22) PCT Filed: Feb. 28, 2005

(86) PCT No.: PCT/JP2005/003298

§ 371 (c)(1),
(2), (4) Date: Oct. 31, 2005

(87) PCT Pub. No.: WO2005/086288

PCT Pub. Date: Sep. 15, 2005

(65) Prior Publication Data

US 2007/0080882 A1    Apr. 12, 2007

(30) Foreign Application Priority Data

Mar. 4, 2004  (JP) .............................. 2004-060366
Jun. 11, 2004 (JP) .............................. 2004-173509

(51) Int. Cl.
*H01Q 7/08* (2006.01)

(52) U.S. Cl. .................... 343/788; 343/711; 343/787

(58) Field of Classification Search ................ 343/702, 343/711, 713, 787, 788
See application file for complete search history.

(56) References Cited

U.S. PATENT DOCUMENTS 6,400,330 B1 *   6/2002  Maruyama et al. ......... 343/788
6,965,352 B2 *  11/2005  Ohara et al. ................ 343/788
7,023,395 B2 *   4/2006  Ohara et al. ................ 343/788
7,095,381 B2 *   8/2006  Kimura et al. ............. 343/788

FOREIGN PATENT DOCUMENTS

| JP | S50-102234 | 8/1975 |
|---|---|---|
| JP | H6-13213 | 2/1994 |
| JP | 09-125776 | 5/1997 |
| JP | 10-110565 | 4/1998 |
| JP | 2002-030844 | 1/2002 |
| JP | 2004/364231 | 12/2004 |
| WO | WO 02/45210 | 6/2002 |

OTHER PUBLICATIONS

International Search Report corresponding to International Application No. PCT/JP2005/J003298, dated Jun. 28, 2005.

* cited by examiner

*Primary Examiner*—Tan Ho
(74) *Attorney, Agent, or Firm*—RatnerPrestia

(57) ABSTRACT

An antenna device has a core made of a magnetic material, a coil formed by winding a conducting wire on a predetermined range including the core and the outer region of the core, and a sub-core that adjusts the resonance frequency by moving in the inner peripheral region of the coil and in the direction orthogonal to the winding direction of the coil. A communication system of the present invention is a combination of an external communication device, the antenna device, and an internal communication device that is connected to the antenna device and is disposed in a cabin.

9 Claims, 9 Drawing Sheets

ANTENNA DEVICE AND COMMUNICATION SYSTEM USING IT

TECHNICAL FIELD

The present invention relates to an antenna device capable of adjusting resonance frequency, especially an antenna device for a vehicle for remotely controlling the locking or unlocking of a door of the vehicle, and a communication system using the antenna device.

BACKGROUND ART

Recently, a wireless door locking/unlocking mode where a door of a vehicle is locked or unlocked by remote control becomes widespread, and hence an antenna device for the vehicle and a communication system using the antenna device are used. Such wireless mode requires an antenna device that allows a driver to certainly remotely control the door within a predetermined distance range from the vehicle and a communication system using the antenna device.

A conventional antenna device for a vehicle employed for the wireless mode and a communication system using the antenna device are described hereinafter with reference to FIG. 11 and FIG. 12.

FIG. 11 is a schematic diagram of a conventional general communication system for locking or unlocking door 51 of vehicle 50 in wireless mode. Antenna device 52 for transmitting or receiving radio waves to communicate with the outside is built in mirror movable unit 54. Mirror movable unit 54 is mounted to mirror fixing unit 53 disposed in door 51 of vehicle 50. Mirror movable unit 54 is opened or closed automatically or manually. In other words, the driver operates a switch in the vehicle to automatically open or close mirror movable unit 54, or the driver manually and directly operates mirror movable unit 54 to open or close it.

External communication device 56 communicates with antenna device 52 interactively. External communication device 56 is specific to vehicle 50 and transmits a code or the like specific to vehicle 50. The shape of external communication device 56 is a card shape for example, and is selected to allow the driver to carry the device even when the driver goes away from vehicle 50.

Antenna device 52 is connected to an electronic circuit (not shown) of an internal communication device installed in vehicle 50. The electronic circuit processes information transmitted from external communication device 56, determines whether or not the information is a code specific to vehicle 50, and locks or unlocks the door. The communication system is a combination of external communication device 56, antenna device 52, and the electronic circuit.

Antenna device 52 is formed of a ferrite core, a hollow bobbin into which the core is inserted, a coil wound on the outer periphery of the bobbin, a capacitor, and a resistor. The coil, the capacitor, and the resistor are interconnected in series, and both ends of the connection are electrically connected to the electronic circuit, thereby forming a series resonant circuit. These are not shown.

When all doors 51 of vehicle 50 are closed, and a radio wave is transmitted from external communication device 56 in a state where the driver separates from vehicle 50, antenna device 52 receives the radio wave, the electronic circuit verifies the radio wave against the specific certified code, and locks or unlocks doors 51.

In conventional antenna device 52 and the communication system using the antenna device, however, when the driver of vehicle 50 folds mirror movable unit 54, the direction of antenna device 52 built in mirror movable unit 54 changes. As a result, the directivity of antenna device 52 changes, and hence the driver cannot always and certainly perform the remote control within a predetermined distance range from vehicle 50.

Therefore, a configuration where an antenna device is mounted to the inside of a mirror fixing unit for fixing a mirror, for example, is disclosed in Japanese Patent Unexamined Publication No. 2004-364231. FIG. 12 shows the configuration of this antenna device. In this antenna device, coil 300 is formed by winding a conducting wire on an outer peripheral region of hollow bobbin 200 made of dielectric resin, and ferrite core 100 is inserted into bobbin 200.

Case 400 stores coil 300, capacitor 900, and resistor 110, and they are interconnected by predetermined wiring. Thin lead terminals 500 and 600 made of conductors are insert-molded in case 400. Part other than coil 300, core 100, bobbin 200, capacitor 900, resistor 110, and lead terminals 500 and 600 in case 400 is filled with resin 220 such as silicone.

This antenna device has circuitry where coil 300, capacitor 900, and resistor 110 are interconnected in series and lead terminals 500 and 600 are disposed at both ends of this connection. Lead terminals 500 and 600 are electrically connected to an electronic circuit as the internal communication device disposed in the vehicle body, thereby forming a series resonant circuit.

The antenna device is mounted to the mirror fixing unit of the vehicle, so that the mirror fixing unit does not move even when the driver folds the movable unit of the door mirror. Therefore, the direction of the antenna device in the mirror fixing unit does not change, and hence the directivity of the antenna device does not change before and after the folding.

However, the directivity of the antenna device has a characteristic where the directivity expands from the mounted position as the origin. The driver, in performing the remote control, is apt to carefully watch the door handle rather than the mirror fixing unit. Therefore, when the antenna device is mounted to the inside of the mirror fixing unit, the behavioral characteristic of the driver makes it difficult to obtain high directivity of the antenna device.

While, in Japanese Patent Unexamined Publication No. H9-125776, a wireless door locking/unlocking device is disclosed that can certainly automatically lock a door even when the driver is near the vehicle in getting out and can sufficiently improve secrecy of an identification code. The locking/unlocking device has an antenna device that transmits a signal for starting the external communication device and receives a signal including the identification code transmitted from the external communication device. The locking/unlocking device further has a door lock controlling means for locking or unlocking the door based on the signal received by the antenna device. A door outer handle made of resin is disposed in the door. The antenna device is disposed near the door outer handle, and the communication distance between the antenna device and the external communication device is set at 50 cm or shorter. In this conventional example, a specific mounted position of the antenna device is inside the door outer handle.

Since the communication distance between the antenna device and the external communication device is set at 50 cm or shorter in the conventional example, for operating the locking/unlocking device, the driver must approach the door until this distance. When the antenna device is disposed near the door outer handle, the locking/unlocking device is apt to suffer impact or vibration that is caused by the motion of the driver in operating the door outer handle, and the operation reliability is low.

When the locking/unlocking device is mounted to the vehicle, the resonance frequency shifts dependently on the mounted position and hence this shift is required to be adjusted. However, in the conventional antenna device, this adjustment cannot be easily and accurately performed.

The present invention addresses the conventional problems. The present invention provides an antenna device where the adjusting range of the resonance frequency is large and certain adjustment can be performed, and a communication system allowing the driver to certainly perform the remote control within a predetermined distance range from the vehicle using the antenna device.

SUMMARY OF THE INVENTION

An antenna device of the present invention has the following elements:
 a core made of a magnetic material;
 a coil formed by winding a conducting wire on a predetermined range including the core and the outer region of the core; and
 a sub-core that adjusts the resonance frequency by moving in the inner peripheral region of the coil and in the direction orthogonal to the winding direction of the coil.

The sub-core may be movably mounted also to the outside of the winding region.

Thanks to such a configuration, the shift of the resonance frequency of the antenna device can be easily adjusted.

Another configuration may be employed. In other words, the antenna device further has a case for storing the core and the sub-core. The core is engaged with a first recessed part disposed in the case, and has a recessed part in parallel with the first recessed part. The coil is formed in the outer peripheral region of the case for storing the core and the sub-core. The sub-core is movably engaged with the recessed part disposed in the core and with a second recessed part coplanar with the former recessed part formed in the case, and adjusts the resonance frequency.

Thanks to this configuration, the resonance frequency can be adjusted over a wide range.

Another configuration may be employed where the case is used as a sub-case, the sub-case that stores the core, the sub-core, and the coil is further stored in another case for storing the whole. Thanks to this configuration, the core is not damaged when the antenna device is mounted to a predetermined place of the vehicle.

The coil may be formed by winding the conductor with a narrower pitch in a set region than in the other region. At least one of the core and the sub-case may be formed of a magnetic material made of manganese (Mn)-based ferrite. Thanks to this configuration, the resonance frequency can be adjusted in a wider range.

The antenna device may further have resin for fixing the sub-core. Thanks to this configuration, after the sub-core is moved to adjust the resonance frequency, the sub-core can be fixed. Therefore, even when the antenna device is mounted to the vehicle or the like, the accident that the sub-core displaces to vary the resonance frequency can be prevented.

A communication system has the following elements:
 an antenna device mounted to the door handle fixing unit for fixing a door handle of a vehicle;
 an internal communication device that is connected to the antenna device and is disposed in a cabin; and
 an external communication device that communicates with the internal communication device via the antenna device.

The antenna device has the following elements:
 a core made of a magnetic material;
 a coil formed by winding a conducting wire on a predetermined range including the core and the outer region of the core; and
 a sub-core that adjusts the resonance frequency by moving in the inner peripheral region of the coil and in the direction orthogonal to the winding direction of the coil.

The antenna device may further have resin for fixing the sub-core.

In such a configuration, the directivity of the antenna device is constant, and the driver can certainly perform the remote control within a predetermined distance range from the vehicle. When the antenna device is mounted, the resonance frequency can be previously adjusted in response to the mounted position. Therefore, dispersion of the resonance frequency after mounting can be suppressed. When the sub-core is moved to adjust the resonance frequency and is then fixed by the resin, an external force such as an impact can be prevented from varying the resonance frequency of the antenna device.

The present invention can provide an antenna device that allows the driver to certainly perform the remote control within a predetermined distance range from the vehicle and a communication system using the antenna device. As a result, a door of the vehicle can be certainly locked or unlocked by remote control from a certain distance.

Figure 1:
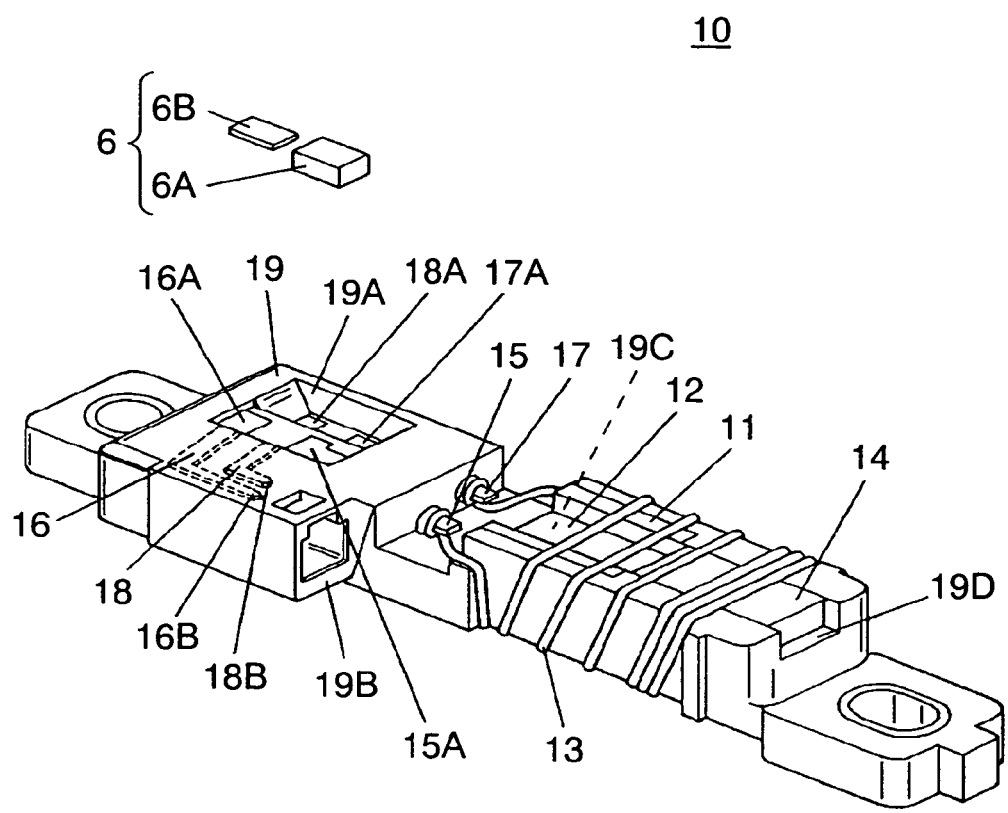
FIG. 1 is a perspective view of an antenna device in accordance with an exemplary embodiment of the present invention.

REFERENCE MARKS IN THE DRAWINGS 6 electronic component
6A, 900 capacitor
6B, 110 resistor
10, 20, 52 antenna device
11, 100 core
12 recessed part
13, 23, 300 coil
14 sub-core
15, 16, 17, 18 conductive piece
15A, 16A, 17A, 18A electrode terminal
16B, 18B connection terminal
19, 30, 400 case
19A recess
19B cylinder unit
19C first recessed part
19D second recessed part
26 door handle fixing unit
26A mounted surface
27 door handle
29 sub-case
29C third recessed part
29D fourth recessed part
30A recess
45 mounting unit
46 screw
47 lead wire
48 connector
50 vehicle
51 door
51A opening
53 mirror fixing unit
54 mirror movable unit
56 external communication device
100 line
110, 120 center line
200 bobbin
220 resin
500, 600 lead terminal

DETAILED DESCRIPTION OF PREFERRED EMBODIMENTS

An antenna device in accordance with an exemplary embodiment of the present invention and a communication system using the antenna device will be described hereinafter with reference to the following drawings. Same elements are denoted with the same reference marks, and the descriptions of those elements are omitted.

FIG. 1 is a perspective view of antenna device 10 in accordance with the exemplary embodiment of the present invention. Recessed part 12 is formed in the whole upper surface in the longitudinal direction of prismatic core 11, as shown in FIG. 1. Here, prismatic core 11 is formed of a magnetic material that is made of Ni-based ferrite and has 1500 of magnetic permeability.

Case 19 is made of heat resistant resin such as liquid crystal polymer or polybutylene-terephthalate. Case 19 has first recessed part 19C for storing core 11 so that core 11 is engaged in its substantially central part. Second recessed part 19D forming the same plane as the surface of recessed part 12 of core 11 when core 11 is stored in first recessed part 19C is connected to first recessed part 19C. Sub-core 14 is inserted into second recessed part 19D. Sub-core 14 is prismatic and is formed of the magnetic material made of Ni-based ferrite, similarly to core 11.

Coil 13 is formed by winding copper wire on the outer peripheral region of case 19 between the region storing core 11 and the region of sub-core 14. Here, the copper wire is coated with heat resistant resin such as polyimide. As shown in FIG. 1, the copper wire is wound with a narrower pitch in the core 11 region than in the sub-core 14 region.

Sub-core 14 is movably mounted inside and outside the winding inner region of coil 13 while being inserted into second recessed part 19D of case 19. In other words, second recessed part 19D of case 19 and recessed part 12 of core 11 have the same plane, so that sub-core 14 can move on the plane. After sub-core 14 is moved to adjust the resonance frequency, sub-core 14 is fixed by resin.

A plurality of plate-like conductive pieces 15, 16, 17 and 18 made of a copper alloy or the like are disposed in case 19 by insert molding. One end of conductive piece 15 of the conductive pieces 15, 16, 17 and 18 is connected to one end of the copper wire forming coil 13 by high-temperature soldering or calking. The other end of conductive piece 15 is disposed as electrode terminal 15A so as to be exposed on the bottom surface of recess 19A of case 19. One electrode of resistor 6B is mounted on electrode terminal 15A by cream soldering or the like.

One end of conductive piece 16 is disposed as electrode terminal 16A so as to be exposed on the bottom surface of recess 19A, similarly to conductive piece 15. The other electrode of resistor 6B is mounted on electrode terminal 16A. The other end of conductive piece 16 is disposed as electrode terminal 16B so as to project to the inside of cylinder unit 19B of case 19.

One end of conductive piece 17 is connected to the other end of the copper wire forming coil 13. The other end of conductive piece 17 is disposed as electrode terminal 17A so as to be exposed on recess 19A, similarly to conductive piece 15 and conductive piece 16. One end of conductive piece 18 is disposed as electrode terminal 18A at a position where it is exposed on recess 19A similarly to conductive piece 17 and faces electrode terminal 17A. The other end of conductive piece 18 is disposed as electrode terminal 18B so as to project to the inside of cylinder unit 19B of case 19. Capacitor 6A is mounted on electrode terminal 17A of conductive piece 17 and electrode terminal 18A of conductive piece 18.

Figure 2:
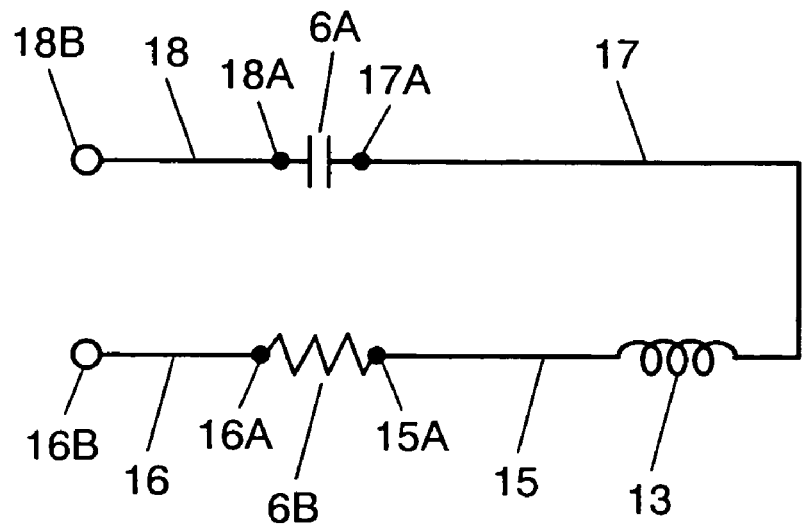
FIG. 2 is a circuit diagram of the antenna device in accordance with the exemplary embodiment.

FIG. 2 is a circuit diagram of antenna device 10. As shown in FIG. 2, in antenna device 10 of the present embodiment, coil 13, resistor 6B, and capacitor 6A are interconnected in series to form a series resonant circuit.

Electronic component 6 is formed of capacitor 6A and resistor 6B. Conductive pieces 15, 16, 17 and 18 mounted with electronic component 6 are plated with tin or the like, and hence soldering or the like is made easy.

In the antenna device having such a configuration, generally, dispersion in capacity of the capacitor or inductance of the coil is apt to cause dispersion in resonance frequency. When the magnetic material is made to approach the coil, generally, the magnetic field varies, the magnetic flux distribution of the coil varies, and hence the inductance of the coil also varies. The varying amount increases, as the magnetic material is made to approach a region where the magnetic flux density of the coil is high.

In antenna device 10 of the present embodiment, sub-core 14 can move on recessed part 12 of core 11 and first recessed part 19C of case 19. Therefore, by moving sub-core 14 made of a magnetic material with respect to coil 13, the inductance of the coil 13 can be varied. As a result, antenna device 10 can be adjusted to a predetermined resonance frequency. The magnetic flux density of coil 13 is higher in the winding inner region than in the winding outer region, in antenna device 10. In the winding inner region, the magnetic flux density is higher inside the core 11 region than outside the core 11 region.

Figure 3:
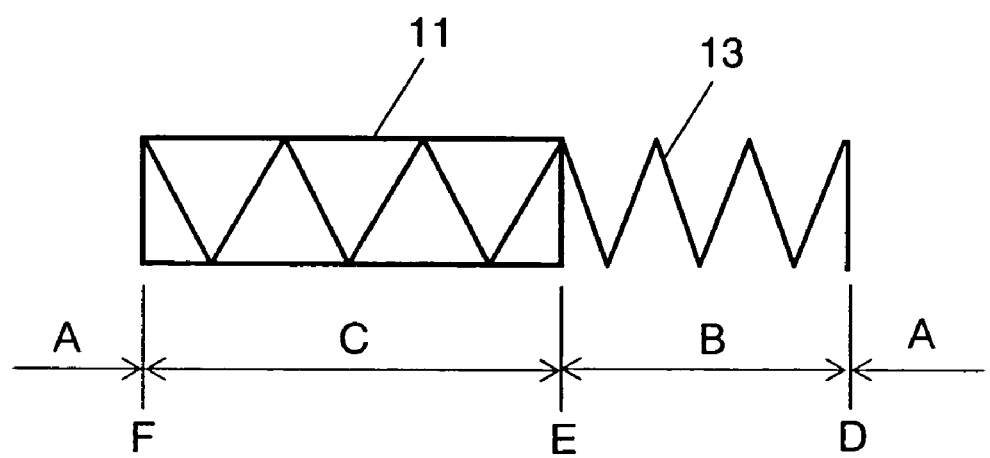
FIG. 3 is a schematic diagram showing a relation between the layout position of a core and a coil and the magnetic flux density in the antenna device in accordance with the exemplary embodiment.

FIG. 3 is a schematic diagram showing a relation between the layout position of core 11 and coil 13 and the magnetic flux density. In FIG. 3, core 11 is positioned in a winding region of coil 13. When it is assumed that the range outside winding region of coil 13 is "A", the range that is in the winding region of coil 13 and has no core 11 is "B", and the range that is in the winding region of coil 13 and has core 11 is "C", the magnetic flux density become larger in the order of A<B<C.

When it is assumed that the boundary between range "A" and range "B" is "D", the boundary between range "B" and range "C" is "E", and the boundary between range "C" and range "A" is "F", the variation rate in magnetic flux density generally becomes larger in the order of D<E<F. The variation rate in magnetic flux density depends on magnetic permeability or the like of the magnetic material.

In antenna device 10 of the present embodiment, therefore, the adjustment of the resonance frequency can be easily performed by appropriately moving sub-core 14 on the plane of recessed part 12 of core 11 and second recessed part 19D of case 19. For example, sub-core 14 is disposed on second recessed part 19D so that the left end of sub-core 14 lies in the winding region of coil 13 and does not overlap core 11 and the right end lies outside the winding region of coil 13, as shown in FIG. 1. In this case, sub-core 14 is positioned in range "B" of FIG. 3 in antenna device 10. This layout indicates that the resonance frequency can be adjusted to a predetermined value. When the resonance frequency is adjusted and sub-core 14 is then fixed by applying a sealant (not shown) such as silicone resin to it, sub-core 14 does not subsequently move and the variation in resonance frequency can be prevented from occurring even when an external force such as an impact acts.

In adjusting the resonance frequency, the inductance of coil 13 can be largely varied even when sub-core 14 is moved only within range "B" or range "C". Therefore, the adjusted range of the resonance frequency can be increased. That is because this moving range of sub-core 14 has high magnetic flux density in the winding region of coil 13.

When sub-core 14 is moved also out of the winding region of coil 13, namely when sub-core 14 is moved beyond boundary "D", boundary "F", or boundary "E" shown in FIG. 3, the variation in inductance can be increased. That is because sub-core 14 is moved in a part having higher variation in magnetic flux density in this case comparing with the case where sub-core 14 is moved only in range "B" or range "C" in the winding region of coil 13. As a result, the variation in inductance with respect to the moving distance of sub-core 14 can be increased, and the resonance frequency can be largely varied only by slightly moving sub-core 14.

The wire is wound with the narrower pitch, namely tightly, in the set region in coil 13, but core 11 may be extended to the tightly winding region in coil 13. This indicates that boundary "E" of FIG. 3 lies in range "B". Thanks to this configuration, the magnetic flux density in range "B" can be increased, variation in resonance frequency obtained when sub-core 14 is moved in range "B" in adjusting the resonance frequency can be further increased.

When difference between variation rates in magnetic flux density is used in adjusting the resonance frequency to the predetermined value, an optimal moving distance of sub-core 14 can be selected in response to the width of the required adjusting range. For example, for performing the adjustment within the range ±1%, sub-core 14 is moved beyond boundary "D" where the variation rate in magnetic flux density is lowest. For performing the adjustment within the range ±3%, sub-core 14 is moved beyond boundary "E" where the variation rate in magnetic flux density is intermediate. For performing the adjustment within the range ±5%, sub-core 14 is moved beyond boundary "F" where the variation rate in magnetic flux density is highest. Thus, the moving distance of sub-core 14 can be selected in response to the width of the required adjusting range.

The magnetic flux density of coil 13 is higher in a tightly winding region of the wire than in a non-tightly winding region in the moving distance. Therefore, as shown in FIG. 1, the inductance of coil 13 can be more rapidly and largely varied in the case where the sub-core 14 is inserted and moved from the tightly winding region of the wire of coil 13 than in the case where the sub-core 14 is inserted and moved from the non-tightly winding region of the wire of coil 13. Therefore, the resonance frequency can be adjusted more speedily.

Antenna device 10 of the present embodiment has the following elements:
  core 11;
  coil 13 where a wire is wound on the outer peripheral region of case 19 including core 11 in a certain range; and
  movable sub-core 14.

After the completion of the adjustment of the resonance frequency, sub-core 14 is fixed by resin. Therefore, since sub-core 14 is fixed after it is moved to adjust the resonance frequency, sub-core 14 does not move even when antenna device 10 is mounted to the vehicle or the like.

In antenna device 10 having such a configuration, connection terminals 16B and 18B projecting into cylinder unit 19B of case 19 are electrically connected to an electronic circuit (not shown) as the internal communication device in the vehicle.

A communication system using antenna device 10 of the present embodiment is described hereinafter.

Figure 4:
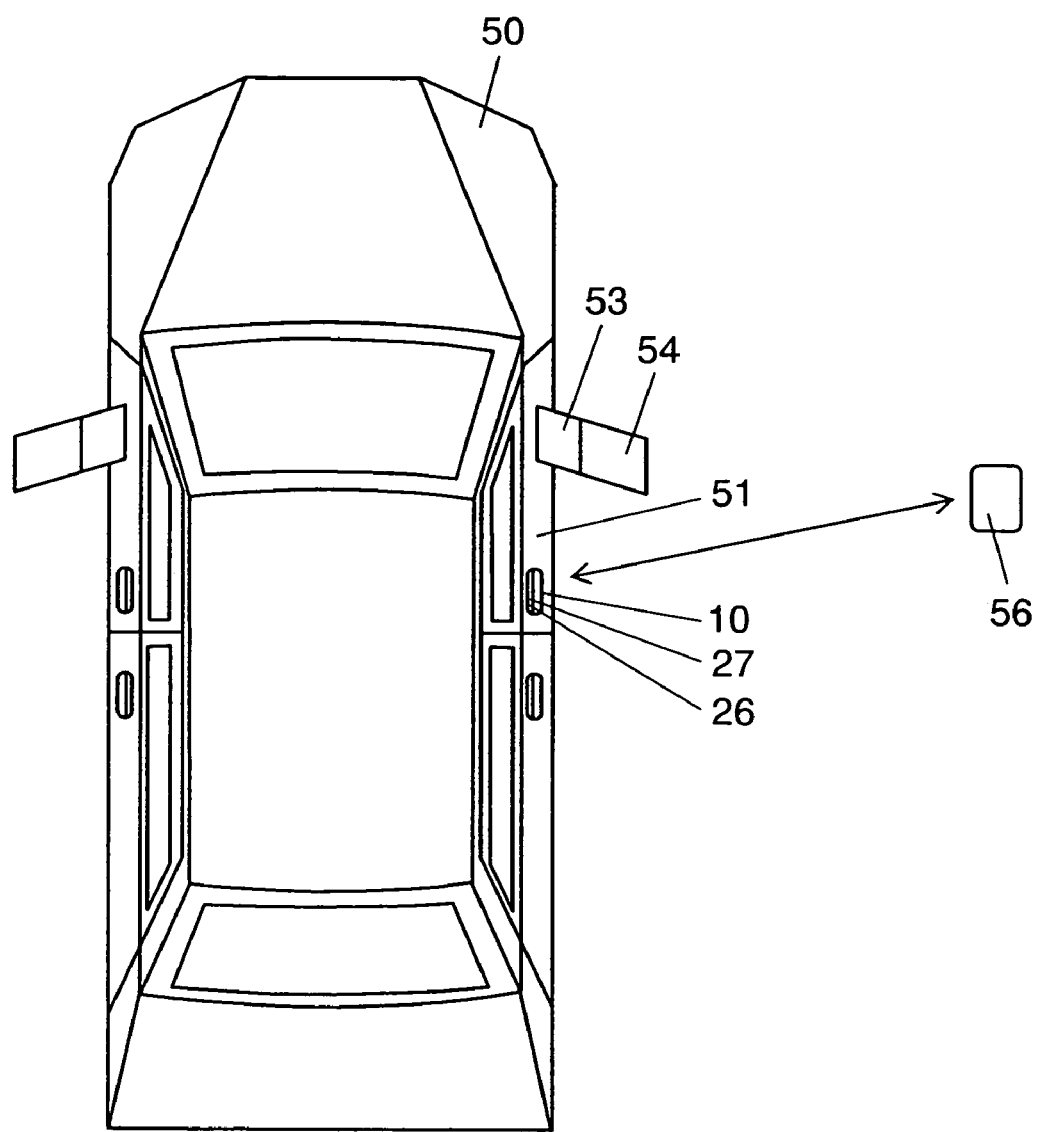
FIG. 4 is a conceptual diagram of a communication system formed using the antenna device in accordance with the exemplary embodiment.
Figure 5:
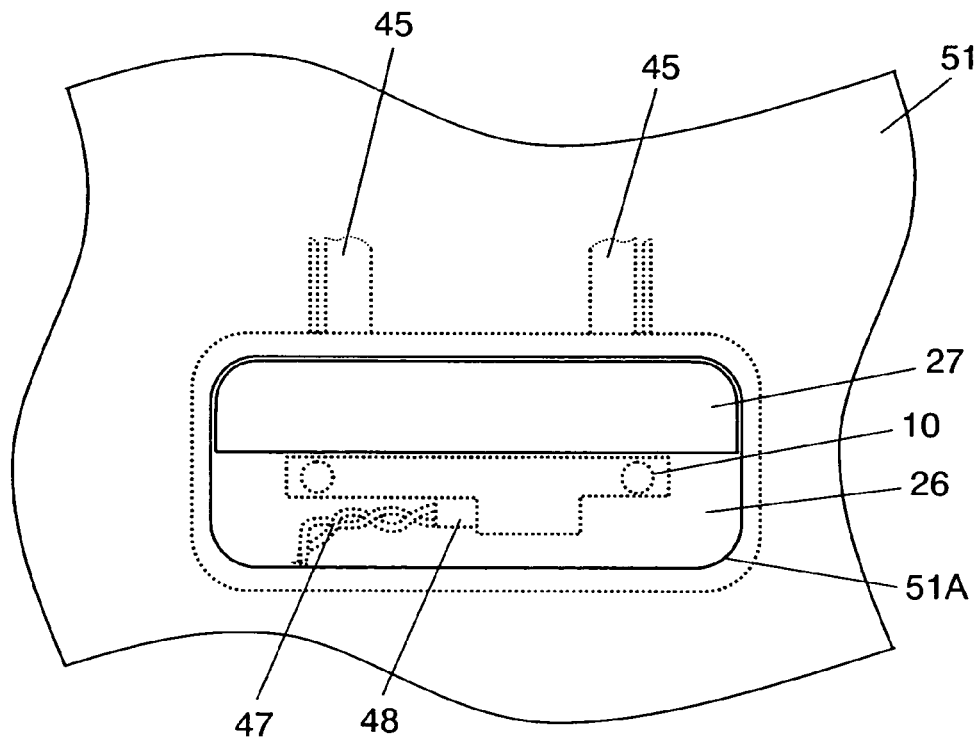
FIG. 5 is a front view, from the outside of the cabin, of the proximity of a door handle fixing unit of a vehicle in accordance with the exemplary embodiment.
Figure 6:
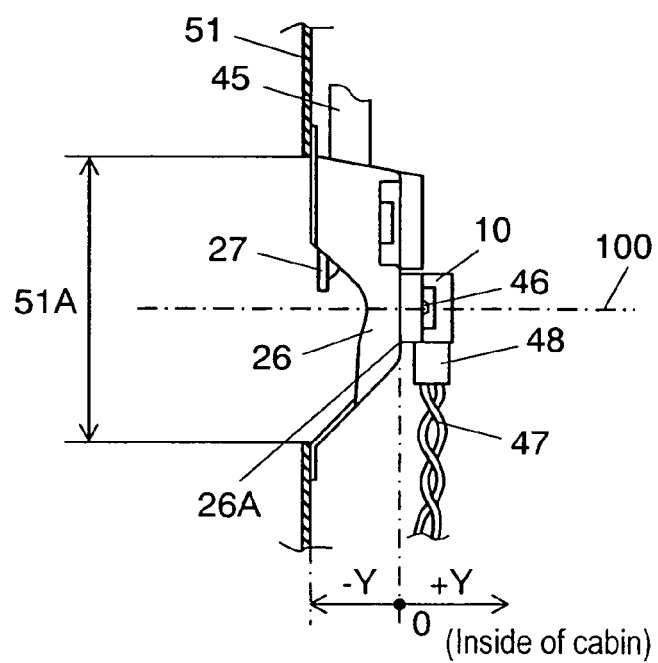
FIG. 6 is a side view of the proximity of the door handle fixing unit in accordance with the exemplary embodiment.
Figure 7:
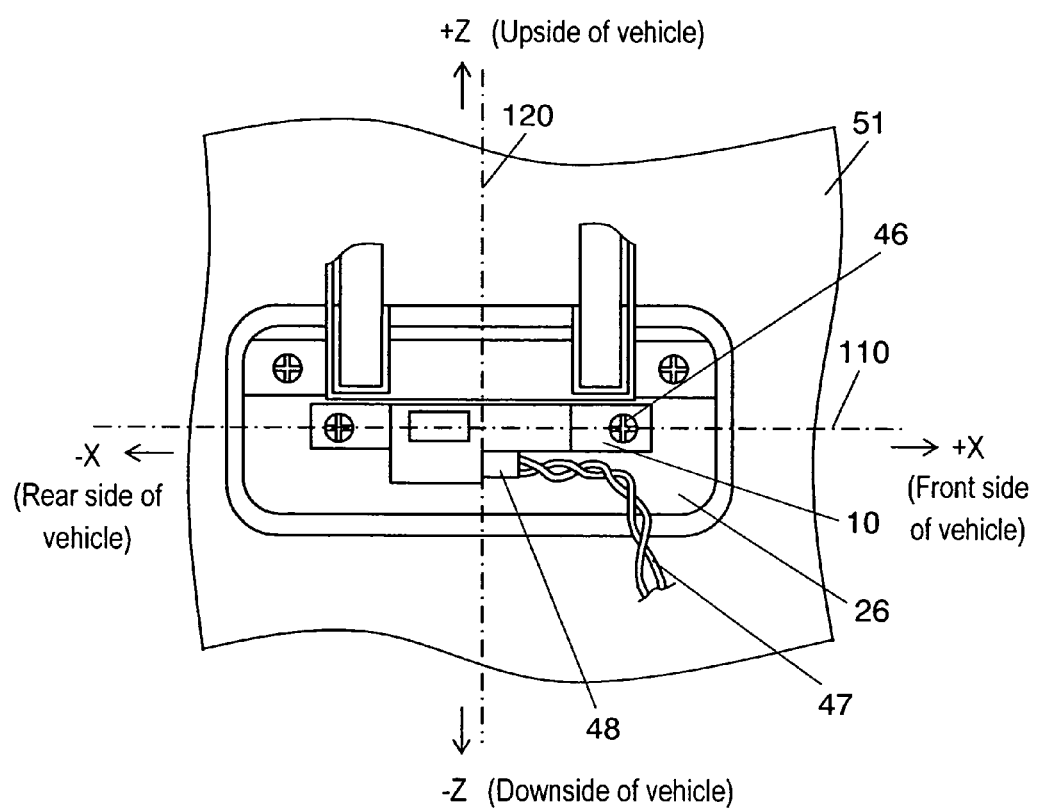
FIG. 7 is a view from the back side, namely the inside of the cabin, of the proximity of the door handle fixing unit in accordance with the exemplary embodiment.

FIG. 4 is a conceptual diagram of a communication system formed using antenna device 10 of the present exemplary embodiment, and door 51 of vehicle 50 is locked or unlocked in wireless mode in this communication system. FIG. 5 is a front view, from the outside of the cabin, of the proximity of door handle fixing unit 26 of vehicle 50. FIG. 6 is a side view of the proximity of door handle fixing unit 26. FIG. 7 is a view from the back side, namely the inside of the cabin, of the proximity of door handle fixing unit 26, and interior material or the like is removed.

In these drawings, door handle fixing unit 26 is mounted to opening 51A that is disposed in door 51 on the driver seat side or the front passenger seat side of vehicle 50. Door handle fixing unit 26 is larger than opening 51A in door 51 as shown in FIG. 5 and FIG. 6, is mounted to a predetermined position of opening 51A, and is fixed to door 51 on the inside of the cabin by mounting unit 45 that is disposed in the upper parts of door handle fixing unit 26. Door handle fixing unit 26 supports door handle 27. Door handle fixing unit 26 is made of dielectric resin such as polybutylene-terephthalate.

Door handle 27 is mounted to door handle fixing unit 26. A driver can open door 51 by pulling door handle 27. Door handle 27 is formed by sheet metal, dielectric resin such as polybutylene-terephthalate, or such resin with plated metal.

Antenna device 10 for transmitting or receiving electromagnetic waves to communicate with the outside is mounted to the back surface of door handle fixing unit 26, namely a predetermined place inside the cabin, through screw 46 or the like.

External communication device 56 communicates with antenna device 10 interactively. This external communication device is specific to vehicle 50 and transmits a code or the like specific to vehicle 50. External communication device 56 has a small shape suitable for carrying, for example a card shape, so that the driver can carry the device even when the driver goes away from vehicle 50. Antenna device 10 is connected to an electronic circuit (not shown) as the internal communication device installed in vehicle 50. The electronic circuit processes information transmitted from external communication device 56, determines whether or not the information is the code specific to vehicle 50, and locks or unlocks the door.

The communication system of the present embodiment is a combination of external communication device 56, antenna device 10, and the electronic circuit (not shown) as the internal communication device. Here, the electronic circuit is connected to antenna device 10 through connector 48 and lead wire 47, and is disposed in the cabin.

In such a communication system, the electronic circuit regularly outputs a signal for requesting the transmission of the certified code to external communication device 56 (for example, a portable card), and antenna device 10 converts the signal to an electromagnetic wave with a predetermined resonance frequency and transmits it. When external communication device 56 receives the electromagnetic wave, external communication device 56 converts the signal of the certified code to an electromagnetic wave and transmits it, antenna device 10 receives this electromagnetic wave, the electronic circuit verifies the certified code of the received signal, and door 51 is locked or unlocked.

Antenna device 10 is mounted to door handle fixing unit 26 with reference to mounted surface 26A of antenna device 10 on door handle fixing unit 26. Here, door handle fixing unit 26 is mounted to opening 51A in door 51 as shown in FIG. 6. When these mounted positions are displaced, the resonance frequency shifts. The shift of the resonance frequency must be corrected, or the layout thereof must be set so that the shift is within the shift allowance.

Figure 8:
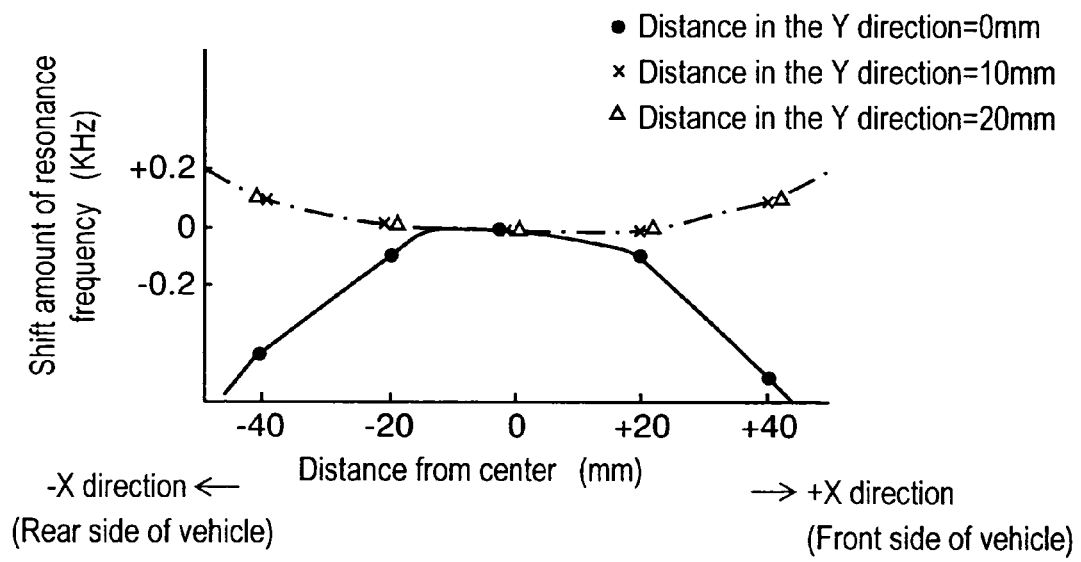
FIG. 8 is a diagram showing a result of an electrical characteristic of the antenna device that is determined by using the mounted position of the antenna device in the Y direction as a parameter and by changing the mounted position in the X direction, namely longitudinal direction of the vehicle, in accordance with the exemplary embodiment.

For example, FIG. 8 is a diagram showing a result of an electrical characteristic of antenna device 10 that is determined by using the mounted position of antenna device 10 in the Y direction as a parameter and by changing the mounted position in the X direction, namely longitudinal direction of the vehicle. The mounted position of antenna device 10 in the Y direction is defined as follows. Using mounted surface 26A on door handle fixing unit 26 shown in FIG. 6 as a reference (origin), the inside of the cabin along line 100 perpendicular to mounted surface 26A is defined as +Y direction, and the door 51 side is defined as −Y direction.

In FIG. 8, the distance from the origin (0 point) shown in FIG. 6 to the mounted position is defined as distance in the Y direction.

The mounted position of antenna device 10 in the X direction of vehicle 50 is defined as follows. Using vertical center line 120 of door handle fixing unit 26 shown in FIG. 7 as a reference (origin), the front direction of vehicle 50 is defined as +X direction, and the rear direction is defined as −X direction. In FIG. 8, the distance in the X direction is called distance from the center and is shown on the horizontal axis. The vertical axis shows the shift amount from resonance frequency $f_0$ of antenna device 10.

As shown in FIG. 8, the resonance frequency shifts dependently on the mounted position of antenna device 10. In antenna device 10 of the present embodiment, however, this shift can be adjusted by movement of sub-core 14.

Figure 9:
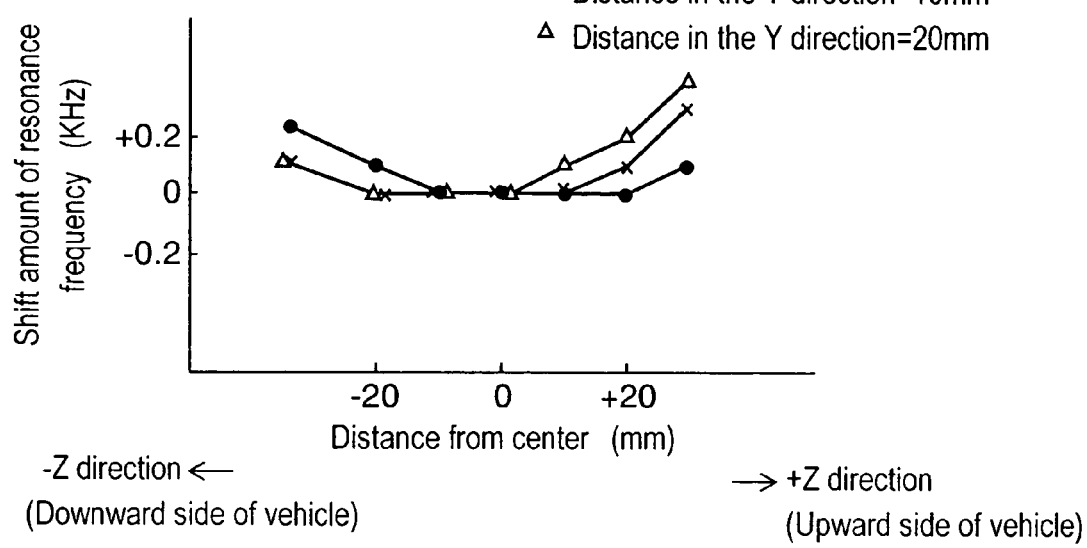
FIG. 9 is a diagram showing a result of an electrical characteristic of the antenna device that is determined by using the mounted position in the Y direction as a parameter and by changing the mounted position in the Z direction, namely vertical direction of the vehicle, in accordance with the exemplary embodiment.

FIG. 9 is a diagram showing a result of an electrical characteristic of antenna device 10 that is determined by using the mounted position in the Y direction as a parameter and by changing the mounted position in the Z direction, namely vertical direction of vehicle 50. The definition of the mounted position of antenna device 10 in the Y direction is the same as that in FIG. 8. The mounted position of antenna device 10 in the Z direction of vehicle 50 is defined as follows. Using horizontal center line 110 of door handle fixing unit 26 shown in FIG. 7 as a reference (origin), the upward direction of vehicle 50 is defined as +Z direction, and the downward direction is defined as −Z direction. In FIG. 9, the distance in the Z direction is called distance from the center and is shown on the horizontal axis. The vertical axis shows the shift amount from resonance frequency $f_0$ of antenna device 10.

As shown in FIG. 9, the resonance frequency shifts dependently on the mounted position of antenna device 10. In antenna device 10 of the present embodiment, however, this shift can be adjusted by movement of sub-core 14.

As shown in FIG. 8 and FIG. 9, when the distance from the center in the X direction or the distance from the center in the Z direction is changed, the resonance frequency shifts from resonance frequency $f_0$. Sub-core 14 of antenna device 10 is appropriately moved in response to this shift, thereby adjusting the resonance frequency.

Figure 10:
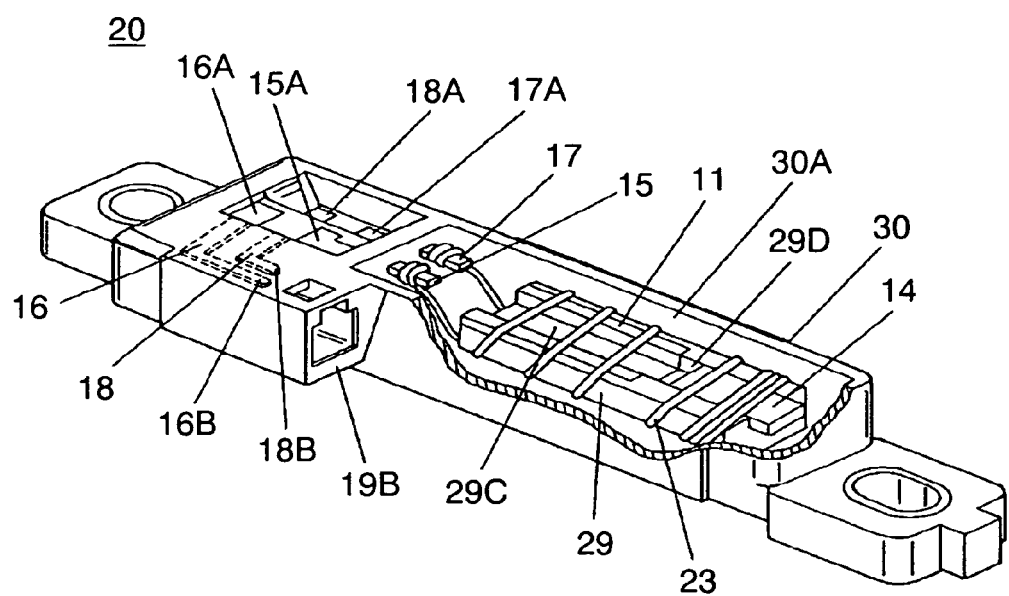
FIG. 10 is a perspective view of another antenna device in accordance with the exemplary embodiment of the present invention.
Figure 11:
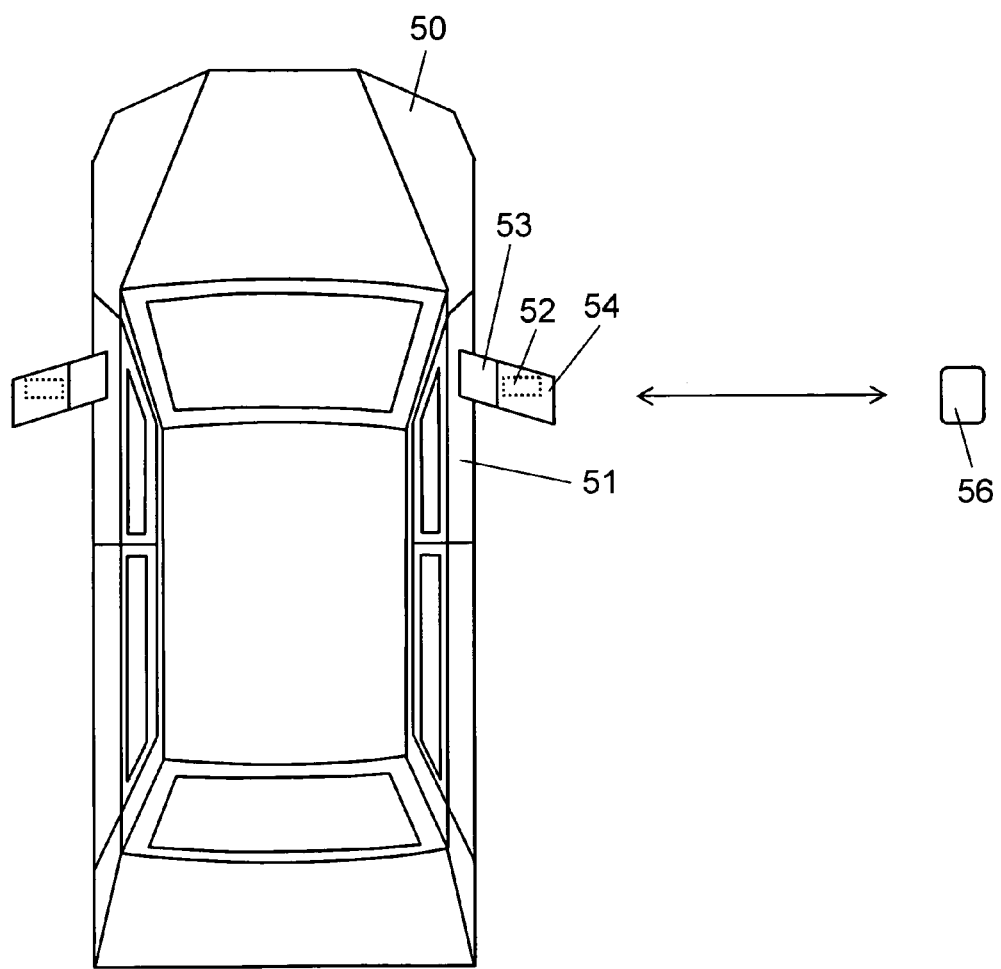
FIG. 11 is a conceptual diagram of a conventional general communication system for locking or unlocking a door of a vehicle in wireless mode.
Figure 12:
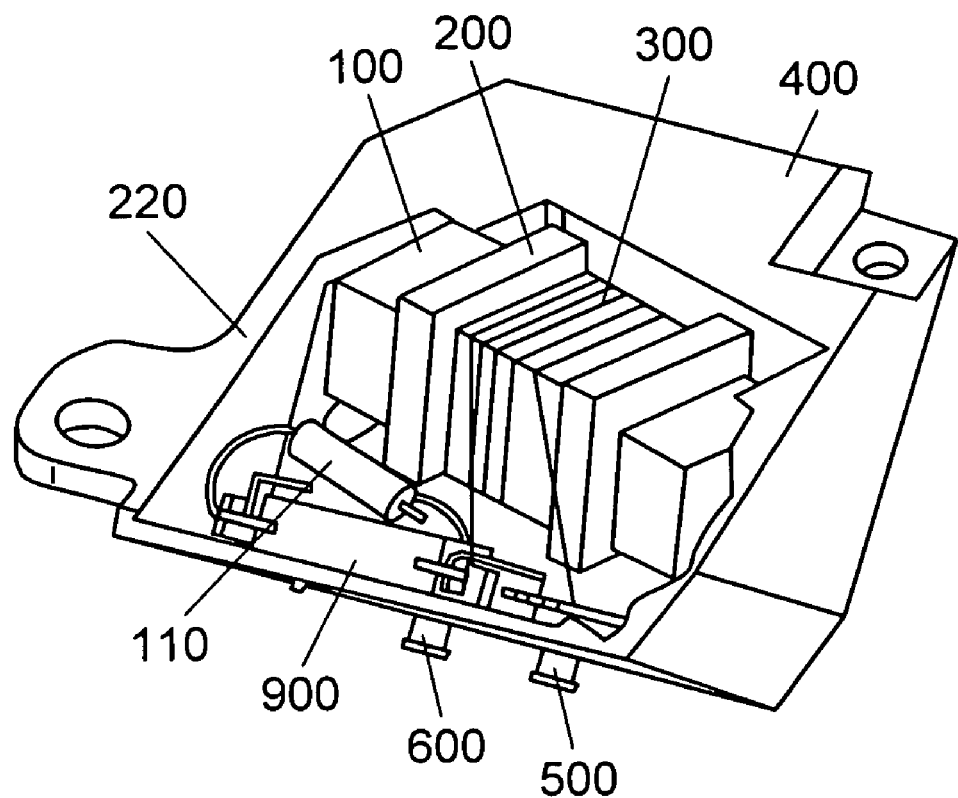
FIG. 12 is a perspective view of an antenna device to be mounted inside a mirror fixing unit for fixing a mirror.

FIG. 10 is a perspective view of another antenna device 20 in accordance with the present exemplary embodiment. Another antenna device 20 employs sub-case 29 having third recessed part 29C and fourth recessed part 29D having the same shape as those of first recessed part 19C and second recessed part 19D that are disposed in case 19 in antenna device 10 shown in FIG. 1. Core 11 and sub-core 14 are engaged with sub-case 29, and coil 23 is wound on the outer peripheral region of sub-case 29. Sub-case 29 having such a configuration is stored in recess 30A of case 30, thereby forming another antenna device 20. This configuration can prevent coil 23 from damaging.

By sealing recess 30A with a sealant (not shown) such as silicone resin after the storing, the water proofing property of antenna device 20 can be increased and the displacement of sub-core 14 from the initial position due to an impact or the like can be prevented.

In antenna device 20 having such a configuration, also, the resonance frequency can be easily adjusted by appropriately moving sub-core 14.

In the above description, the sub-core is moved on a recessed part formed on the upper surface of the core or case. However, the present invention is not limited to such a configuration. For example, a prismatic hole may be formed in a substantially central part of the core or case, and the sub-core may be moved in the hole. Even when a recessed part is formed in a side surface or the lower surface and the sub-core is moved on the recessed part, a similar effect can be obtained.

The configuration may be used where no recessed part is formed on the upper surface of the core or case, the coil is fixed by coating a predetermined place of the side surface or the lower surface of the core with an adhesive, and the sub-core is then moved to a clearance in the outer periphery of the coil and core.

A winding region with a narrower pitch is disposed in the outer peripheral region of the case in the above description; however, a constant winding pitch may be used and the wire may be repeatedly wound on the same place.

The core and the sub-core are formed of a magnetic material that is made of Ni-based ferrite; however, the present invention is not limited to this. For example, at least one of the core and the sub-core may be formed of a magnetic material that is made of Mn-based ferrite. The magnetic material made of Mn-based ferrite has higher magnetic permeability than that of the magnetic material made of Ni-based ferrite, and can largely change the magnetic field. Therefore, the inductance of the coil can be more largely changed, and the adjusting range of the resonance frequency can be further increased.

A magnetic material made of rare earth such as neodymium (Nd) or samarium (Sm) having high magnetic force may be used. A magnetic material made of so-called plastic magnet, in which powder of the magnetic material made of ferrite or the like is mixed into plastics, may be used.

An interactive communication system where both the external communication device and the antenna device of the vehicle transmit or receive signals from each other has been described; however, the present invention is not limited to this. For example, a key having a communication means may be used where a vehicle specific key that is inserted into a keyhole in the door of the vehicle to lock and unlock the door is integrated with an external communication device. A unidirectional communication system having the following function may be used. A driver of the vehicle pushes a transmission button of the key having the communication means, a transmission unit of the key transmits an electromagnetic wave of the specific certified code, and the antenna device receives the electromagnetic wave and locks or unlocks the door of the vehicle.

In the present invention, an antenna device formed of a coil or the like having a wound conducting wire is mounted to a door handle fixing unit for fixing a door handle of the vehicle. The antenna device, an electronic circuit disposed in the cabin, and the external communication device form a communication system. The direction of the antenna device is constant and the directivity is kept constant in this configuration, differently from the case where the antenna device is mounted to a mirror movable unit that is often folded. Even when the resonance frequency of the antenna device shifts dependently on the mounted position, the resonance frequency can be easily adjusted, and hence the productivity can be improved. The driver can perform certain remote control within a predetermined distance range from the vehicle.

The transmission of an impact or vibration caused by movement of the door handle to the antenna device can be made more difficult comparing with the case where the antenna device is mounted to the door handle. Here, for example, the impact or vibration is caused by the accident that the door handle hits the door handle fixing unit when the driver pulls and releases the door handle.

INDUSTRIAL APPLICABILITY

An antenna device of the present invention and a communication system using the antenna device are useful for a communication system for a vehicle for remotely controlling the locking or unlocking of the door of the vehicle, because the adjusting range of the resonance frequency is wide and the resonance frequency can be certainly adjusted.

The invention claimed is:

1. An antenna device comprising:
   a core made of a magnetic material;
   a coil formed by winding a conducting wire on a predetermined range including the core and the outer region of the core; and
   a sub-core that adjusts resonance frequency by moving in the inner peripheral region of the coil and in the direction orthogonal to the winding direction of the coil.

2. The antenna device according to claim 1,
   wherein the sub-core is movably mounted also outside of the winding region in the coil.

3. The antenna device according to claim 1, further comprising a case for storing the core and the sub-core,
   wherein
   the core is engaged with a first recessed part disposed in the case, and has a recessed part in parallel with the first recessed part,
   the coil is formed in the outer peripheral region of the case for storing the core and the sub-core, and
   the sub-core is movably engaged with the recessed part disposed in the core and with a second recessed part of the case that is coplanar with the recessed part formed in the core, and adjusts the resonance frequency.

4. The antenna device according to claim 3,
   wherein the case is a sub-case, and the sub-case that stores the core, the sub-core, and the coil is further stored in another case for storing the whole.

5. The antenna device according to claim 1,
   wherein the coil is formed by winding the conducting wire with a narrower pitch in a set region than in the other region.

6. The antenna device according to claim 1,
   wherein at least one of the core and the sub-core is formed of a magnetic material made of manganese (Mn)-based ferrite.

7. The antenna device according to claim 1, further comprising resin for fixing the sub-core.

8. A communication system comprising:
   an antenna device mounted to the door handle fixing unit for fixing a door handle of a vehicle;
   an internal communication device that is connected to the antenna device and is disposed in a cabin; and
   an external communication device that communicates with the internal communication device via the antenna device,
   wherein the antenna device including:
   a core made of a magnetic material;
   a coil formed by winding a conducting wire on a predetermined range including the core and the outer region of the core; and
   a sub-core for adjusting resonance frequency by moving in the inner peripheral region of the coil and in the direction orthogonal to the winding direction of the coil.

9. The communication system according to claim 8, further comprising resin for fixing the sub-core.

* * * * *